United States Patent
Aiso et al.

(10) Patent No.: US 9,416,991 B2
(45) Date of Patent: Aug. 16, 2016

(54) SOLAR HEAT COLLECTOR

(71) Applicant: YAZAKI ENERGY SYSTEM CORPORATION, Tokyo (JP)

(72) Inventors: Kazuhiro Aiso, Shizuoka (JP); Tooru Matsumoto, Shizuoka (JP)

(73) Assignee: YAZAKI ENERGY SYSTEM CORPORATION, Tokyo (JP)

( * ) Notice: Subject to any disclaimer, the term of this patent is extended or adjusted under 35 U.S.C. 154(b) by 371 days.

(21) Appl. No.: 14/045,551

(22) Filed: Oct. 3, 2013

(65) Prior Publication Data
US 2014/0026885 A1 Jan. 30, 2014

Related U.S. Application Data

(63) Continuation of application No. PCT/JP2012/060181, filed on Apr. 13, 2012.

(30) Foreign Application Priority Data

Apr. 13, 2011 (JP) .................................. 2011-089226

(51) Int. Cl.
*F24J 2/05* (2006.01)
*F24J 2/46* (2006.01)
(Continued)

(52) U.S. Cl.
CPC .... *F24J 2/05* (2013.01); *F24J 2/20* (2013.01); *F24J 2/205* (2013.01); *F24J 2/465* (2013.01);
(Continued)

(58) Field of Classification Search
CPC ..................................... Y02E 10/40; F24J 2/07

USPC .......................... 126/652, 662, 677, 709, 674
See application file for complete search history.

(56) References Cited

U.S. PATENT DOCUMENTS 2,969,788 A * 1/1961 Newton ..................... F24J 2/26
126/685
4,142,514 A * 3/1979 Newton ..................... F24J 2/10
126/677

(Continued)

FOREIGN PATENT DOCUMENTS

EP 1 496 320 A1 1/2005
JP 57-112642 A 7/1982

(Continued)

OTHER PUBLICATIONS

English language Written Opinion and International Preliminary Report on Patentability (PCT/ISA/237 and 373) for PCT Patent App. No. PCT/JP2012/060181 dated Jun. 5, 2012 and Oct. 15, 2013 respectively.

(Continued)

*Primary Examiner* — Avinash Savani
(74) *Attorney, Agent, or Firm* — Kenealy Vaidya LLP (57) ABSTRACT

In a solar heat collector, a bottom plate and a side plate of a case which is opened in an upper surface are formed of a vacuum thermal insulation material in which a core material is enveloped by a skin and a vacuum is created in an interior of the skin, the skin is formed by welding together circumferential edges of two metal panels which are disposed to face each other with the core material sandwiched therebetween, a plurality of line grooves are formed in the metal panels, and the two metal panels are disposed so that sides thereof from which bottoms of the line grooves protrude are oriented inwards with the core material sandwiched therebetween.

12 Claims, 4 Drawing Sheets

(51) Int. Cl.
*F24J 2/50* (2006.01)
*F24J 2/51* (2006.01)
*F24J 2/20* (2006.01)

(52) U.S. Cl.
CPC .............. *F24J 2/4641* (2013.01); *F24J 2/507* (2013.01); *F24J 2/51* (2013.01); *F24J 2/515* (2013.01); *F24J 2002/4656* (2013.01); *F24J 2002/4678* (2013.01); *F24J 2002/502* (2013.01); *Y02E 10/44* (2013.01)

(56) References Cited

U.S. PATENT DOCUMENTS

| 4,191,169 | A |   | 3/1980  | Hyman    |                   |
|-----------|---|---|---------|----------|-------------------|
| 4,301,789 | A | * | 11/1981 | Artweger | F24J 2/204 126/585 |

FOREIGN PATENT DOCUMENTS

| JP | 62-294849    | A | 12/1987 |
|----|--------------|---|---------|
| JP | 3-89351      | U | 9/1991  |
| JP | 2004-176966  | A | 6/2004  |
| JP | 2004-197953  | A | 7/2004  |
| JP | 2004-278837  | A | 10/2004 |
| JP | 2006-275187  | A | 10/2006 |
| JP | 2007-24298   | A | 2/2007  |
| JP | 2008-82534   | A | 4/2008  |
| JP | 2010-127463  | A | 6/2010  |
| JP | 2010-266182  | A | 11/2010 |

OTHER PUBLICATIONS

Japanese Office Action for the related Japanese Patent Application No. 2011-089226 dated Feb. 3, 2015.
Chinese Office Action for the related Chinese Patent Application No. 201280018047.X dated Jun. 30, 2015.
International Search Report and Written Opinion of the International Search Report for PCT/JP2012/060181 dated Jun. 5, 2012.
The extended European Search Report for the related European Patent Application No. 12770965.7 dated Nov. 6, 2014.
Chinese Office Action and Search Report for the related Chinese Patent Application No. 201280018047.X dated Dec. 31, 2014.

* cited by examiner

| CONFIGURATIONS OF VACUUM LIGHT TRANSMITTING MEMBER | | REFLECTANCE (%) | ABSORPTANCE (%) | TRANSMITTANCE (%) |
|---|---|---|---|---|
| COMPARISON EXAMPLE | NORMAL GLASS | 13.1 | 11.2 | 75.7 |
| EMBODIMENT 1-1 | HIGHLY TRANSMISSIVE GLASS | 13.4 | 2.9 | 83.7 |
| EMBODIMENT 1-2 | HIGHLY TRANSMISSIVE GLASS WITH REFLECTION PREVENTIVE FILM APPLIED ON ONE SIDE | 8.7 | 2.9 | 88.4 |
| EMBODIMENT 1-3 | HIGHLY TRANSMISSIVE GLASS WITH REFLECTION PREVENTIVE FILM APPLIED ON BOTH SIDES | 3.9 | 2.9 | 93.1 |

• IMPURITIES (IRON OR THE LIKE)
▨ REFLECTION PREVENTING FILM

FIG.8

SOLAR HEAT COLLECTOR

CROSS REFERENCE TO RELATED APPLICATIONS

This application is a continuation of PCT application No. PCT/JP2012/060181, which was filed on Apr. 13, 2012 based on Japanese Patent Application (No. 2011-089226) filed on Apr. 13, 2011, the contents of which are incorporated herein by reference.

BACKGROUND OF THE INVENTION

1. Field of the Invention

The present invention relates to a solar heat collector and more particularly to a technology which enhances the collector efficiency of a solar heat collector by reducing thermal radiation therefrom.

2. Description of the Related Art

Solar heat collectors are such that a supplied heat medium such as water or an anti-freeze is heated up by sunlight and are used as, for example, a hot water supply source or a heat source. As such solar heat collectors, a solar heat collector of a flat plate-type is known in which an absorber plate which converts received sunlight into heat is placed in a box-shaped case while being supported by a thermal insulation material, and an upper opening in the case is covered by a light transmitting member such as a glass plate or a transparent resin plate, whereby sunlight which passes through the light transmitting member is converted into heat by the absorber plate to thereby heat a heat medium which flows in a flow path which is provided in contact with the absorber plate. In order to enhance the collector efficiency of the flat plate-type solar heat collector, the light transmittance of the light transmitting member and the photo-thermal conversion rate (thermal collection rate) of the absorber plate itself need to be enhanced while suppressing heat radiation from the light transmitting member as well as heat radiation from a side plate and a bottom plate of the case.

Although it is considered, for example, to increase the thickness of an insulating material which is provided on the side plate and the bottom plate of the case in order to suppress the heat radiation from the case and the like, a problem is caused that the overall size of the solar heat collector is enlarged. In addition, it is considered to create a vacuum within the case so as to reduce the radiation of heat collected to the absorber plate to the atmosphere from outer surfaces of the case and the light transmitting member, the case and the light transmitting member have to be constructed so as to withstand the atmospheric pressure. Because of this, the materials of the case and the light transmitting member need to be reinforced, and the case and the light transmitting member need, for example, to be reinforced by a spacer, leading to a problem that the weight of the heat collector is increased or the available absorber area is reduced. Further, the vacuum inside the case needs to be maintained over a long period of time, leading to a problem with a seal at the joint portion between the light transmitting member and the case.

Under the background described above, in order to suppress the radiation of heat from a case of such a flat plate-type solar heat collector, according to JP-A-62-294849, it is described that a thermal insulation material such as glass wool is fully laid at a bottom plate portion of a case and that a side plate of the case is formed of a thermal insulation material. In addition, in JP-A-2004-278837 it is implied that a bottom plate and a side plate of a case are formed of a vacuum thermal insulation material so as to reduce the radiation of heat from the bottom plate and the side plate of the case.

Further, JP-A-2010-127463 proposes a vacuum thermal insulating panel which belongs not to the technical field of solar heat collectors but to the technical field of cold thermal insulation for refrigerators or freezers. In this vacuum thermal insulating panel, two metal panels are worked into corrugated panels of a continuous triangular or sine wave. Then, the two metal panels so formed are disposed so that respective ridge lines of the corrugated panels intersect each other at right angles, while root lines of one of the two corrugated panels are in point contact with root lines of the other corrugated panel. Circumferential edges of the two metal panels are bonded together through welding or the like, and a vacuum is created in spaces defined by the two metal panels. According to this technique, the vacuum thermal insulating panel can hold rigidity against internal negative pressure or vacuum and rigidity against the overall deflection or deformation of the panel, and the necessity of a core material, a reinforcement material or a frame material for rigidity reinforcement can be obviated.

Additionally, according to a solar heat collector described in JP-A-2007-24298, a light transmitting member of a vacuum thermal insulating type is proposed. In this light transmitting member, in order to reduce the radiation of heat from the light transmitting member, pyramidal grooves or conical grooves are formed in an inner surface side of one glass plate of two glass plates which constitute a double grazing construction of the light emitting member so as to allow the glass plate to protrude on the inner surface side to thereby form sealed spaces where a vacuum is created. According to this proposal, the vacuum thermal insulating type light transmitting member can be realized which is prevented from collapsing that would otherwise be the case due to internal vacuums when the atmospheric pressure is applied thereto.

In addition, according to JP-UM-A-3-89351, a light transmitting member of a glass tube type is known in which a heat medium tube which doubles as an absorber plate is inserted concentrically in an inner glass tube of two glass tubes making up a double tube construction of the light transmitting member, and a vacuum is produced in a space defined between the two glass tubes so as to suppress the radiation of heat. Among such glass tube type light transmitting members, there is known a light transmitting member in which a heat medium tube having a flat plate-shaped collector fin is inserted concentrically in a glass tube of a single tube construction, and a vacuum is created in a space defined between the glass tubes so as to suppress the radiation of heat.

On the other hand, in JP-A-2004-278837 described above, a technique is proposed in which an inactive gas having a low thermal conductivity is filled in a space defined between two glass panels making up a double grazing construction of a light transmitting member in place of creating a vacuum in the space so as to reduce the radiation of heat from the light transmitting member.

SUMMARY OF THE INVENTION

However, as done in JP-A-62-294849, when the thermal insulation material is fully laid on the bottom plate portion of the case and the side plate is formed of the thermal insulating member, although the amount of heat radiating from the case can be reduced to some extent, there still remains room for a further reduction in the amount of radiating heat by increasing the thermal insulating performance of the case further. In particular, in the case of JP-A-62-294849, in case water or rain water intrudes into the case, the thermal insulation material absorbs the water or rain water, whereby the thermal insulating performance is deteriorated. In addition, water that has evaporated from the thermal insulation material that has absorbed the water or rain water condenses into water drops on an inner surface of the light transmitting member, and the water drops stick to the inner surface, whereby the light transmitting member is clouded up, leading to fears that the collecting performance of the absorber plate is damaged.

In addition, as described in JP-A-2004-278837, when the bottom plate and the side plate of the case are formed of the vacuum thermal insulation material, it is possible to reduce the radiation of heat from the bottom plate having a relatively wide surface area (heat radiating surface area) and the side plate effectively. However, no description on a specific construction of the vacuum thermal insulation material is made in JP-A-2004-278837. Namely, since a large negative pressure is applied to an outer enclosure material such as a metal panel which constitutes a vacuum thermal insulation material, for example, as described in JP-A-2010-127463, the vacuum thermal insulation material needs a core material for reinforcement, a reinforcement material, a frame material or the like to withstand the negative pressure. However, there are fears that the advantage of the vacuum thermal insulation is damaged by the reinforcement member which conducts and radiates heat.

In this respect, according to the vacuum thermal insulation material described in JP-A-2010-127463, since the metal corrugated panels are used as an outer enclosure material and the corrugated panels are superposed one on top of the other with the ridge lines of the corrugated panels intersecting each other at right angles, it is recognized that a sufficient rigidity can be obtained. However, in the field of cold thermal insulation, a temperature difference in thermal insulation is small, and the absolute temperature is in the range from minus several tens of degrees centigrade to plus 10 degrees centigrade. On the other hand, in the field of solar heat collectors, there is a situation in which a so-called dry heating temperature reaches 230° C., and a temperature at the surface of the thermal insulation material reaches 200° C. Consequently, when the vacuum thermal insulation material described in JP-A-2010-127463 is applied to a bottom plate and a side plate of a case of a solar heat collector having a large surface area, although a sufficient rigidity in terms of strength can be provided, since the number of points of contact between the root lines and the ridge lines of the two metal corrugated panels is large, there is caused a problem that the radiation of heat therefrom becomes large accordingly. To deal with this problem, it is considered to increase the height of the ridge lines to ensure a sufficient thermal insulating performance. However, this increases the thickness of the bottom plate and the side plate of the case, leading to a problem that the weight of the solar heat collector is increased.

In addition, according to the technology described in JP-A-2007-24298, it is possible to realize the vacuum thermal insulating light transmitting member which is not collapsed by the internal vacuum, thereby making it possible to reduce largely the radiation of heat from the light transmitting member. However, nothing is taken into consideration to reduce the amount of heat that the bottom plate and the side plate of the case radiate.

Additionally, with the glass tube type light transmitting member described in JP-UM-A-3-89351, in the event that a plurality of glass tubes are arranged at intervals while being oriented towards the sun so as to collect a desired amount of heat, no absorber plate can be disposed between the plurality of glass tubes, leading to a problem that the area efficiency is deteriorated.

A problem that the present invention is to solve is to reduce the radiation of heat from a bottom plate and a side plate of a flat plate-type solar heat collector and enhance the collector efficiency over a wide range from a heat collection at low temperatures to a heat collection at high temperatures.

To solve the problem described above, according to the present invention, there is provided a solar heat collector including: a case having a bottom plate and a side plate, and opened in an upper surface; a light transmitting member provided to cover an opening in the upper surface of the case and formed of a glass plate or a transparent resin plate; an absorber plate disposed between the bottom plate of the case and the light transmitting member to convert received sunlight into heat; a heat-medium flow path thermally connected to the absorber plate and an inlet pipe and an outlet pipe for a heat medium which communicate with the heat-medium flow path, wherein at least the bottom plate of the case is formed of a vacuum thermal insulation material in which a core material formed by compressing a thermal insulation material and having thermal insulation properties and a void is enveloped by a skin and a vacuum is created in an interior of the skin, the skin is formed by welding together circumferential edges of two metal panels which are disposed to face each other with the core material sandwiched therebetween, a plurality of line grooves having any of a triangular section, an arc-shaped section and a sine semi-wave section are formed in the metal panels, and the two metal panels are disposed to face each other on sides thereof from which bottoms of the line grooves protrude with the core material sandwiched therebetween.

Namely, since at least the bottom plate of the case is formed of the vacuum thermal insulation material, the radiation of heat from the bottom plate can be reduced largely. Since the surface area of the side plate is smaller than that of the bottom plate, the radiation of heat from the side plate is smaller than that from the bottom plate, but, it is desirable that the side plate is formed of the same vacuum thermal insulation material as that of the bottom plate. By doing so, the radiation of heat when heat is collected at high temperatures can be reduced so as to enhance the collector efficiency. Additionally, the collector efficiency can also be enhanced in collecting heat at low temperatures when insolation is low. Moreover, since the core material formed by compressing the thermal insulation material and having the thermal insulation properties and the void is covered by the skin, even though water intrudes into the interior of the case, the water is not absorbed by the core material having the thermal insulation properties, and therefore, there is no such situation that the thermal insulation performance is damaged. Additionally, the occurrence of a phenomenon can be prevented in which water absorbed by the thermal insulating core material is evaporated to condense into water on the inner surface of the light transmitting member, and therefore, the light transmitting member is not clouded with water drops. Thus, the heat collecting performance of the solar heat collector can be prevented from being damaged.

In particular, the skin of the vacuum thermal insulation material is formed of the two metal panels which are disposed to face each other with the core material sandwiched therebetween and in which the plurality of line grooves having any of the triangular section, the arc-shaped section and the sine semi-wave section are formed. Therefore, the rigidity of the metal panels can be enhanced, whereby when even thin metal panels are used, the bottom plate can withstand sufficiently the negative pressure produced by the vacuum. Further, the two metal panels are disposed to face each other on the sides thereof from which the bottoms of the line grooves protrude with the core material sandwiched therebetween, and moreover, the core material is formed by compressing the thermal insulation material. Therefore, even though the two metal panels are not disposed so that the sides from which the bottoms of the line grooves protrude are in contact with each other, the bottom plate can withstand sufficiently the compression proof strength of the internal negative pressure. It is noted that in disposing the two metal panels to face each other, the respective line grooves of the two metal panels may be disposed in the same positions or may be disposed parallel in different positions. Additionally, the line grooves may be disposed to intersect each other at right angles or at a certain angle (for example, 45°).

For a metallic material used for the skin which constitutes the vacuum thermal insulation material, for example, a stainless steel (SUS) material having a thickness of 0.15 mm to 0.4 mm can be used. A height of the protruding bottoms of the line grooves (or a depth of the grooves) is preferably in the range of 0.1 mm to 2 mm, and pitches or intervals at which the line grooves are formed is preferably in the range of 3 mm to 50 mm. In addition, a thickness of the core material sandwiched by the two metal panels is preferably in the range of 3 mm to 25 mm. In addition to the SUS material, a metallic material such as an aluminum panel or a copper panel having certain strength can be used, and as this occurs, the vacuum thermal insulation material can be used as the bottom plate or the side plate of the case as it is.

On the other hand, as the core material of the vacuum thermal insulation material, a core material is preferable which is formed by compressing a thermal insulation material and which has thermal insulation properties and a void, and as the core material, a fibrous or foamed thermal insulation material selected at least from glass wool, silica-alumina wool, polyester, and urethane is preferably used. Namely, a fibrous or foamed thermal insulation material is preferable which has a low thermal conductivity, as well as an appropriate repulsive force to enhance a void volume which is effective to vacuum thermal insulation. In particular, a core material which is formed by compressing a thermal insulation material to a thickness which is 1/10 to 1/20 of a thickness at normal pressures is preferable for the vacuum thermal insulation material. For example, white glass wool whose fiber size is in the range of 3.5 μm to 7.5 μm is compressed from a thickness of the order of 200 mm to a thickness of 10 mm to form a core material.

In addition, the light transmitting member can be made by the use of a single glass plate or transparent resin plate as in the case with the conventional one. The glass plate can be formed by the use of a highly transmissive glass having a high transmittance (for example, 90% or larger) in addition to a normal glass such as a soda glass. Additionally, the transparent resin plate can be formed by the use of resins such as acryl, polycarbonate, FEP (copolymer of tetrafluoroethylene and hexafluoropropylene), PTFE (polytetrafluoroethylene), PTCFE (polychlorotrifluoroethylene), and EVOH (ethylene-vinyl alcohol copolymer resin). Namely, the light transmitting member is formed by the use of a material which is superior in sunlight transmission properties, thermal resistance, thermal insulation properties and gas barrier properties.

Further, it is preferable to use a vacuum light transmitting member or a gas-filled light transmitting member in order to enhance the collector efficiency of the solar heat collector by reducing the radiation of heat from the light transmitting member. The vacuum light transmitting member is formed by creating a vacuum in a gap defined between a pair of glass plates or transparent resin plates which are disposed to face each other with a spacer sandwiched therebetween. In addition, the gas-filled light transmitting member is formed by filling a gas in a gap defined between a pair of glass plates or transparent resin plates which are disposed to face each other with a spacer sandwiched therebetween. Here, air or a gas having a low thermal conductivity such as an argon, krypton or xenon gas can be used alone or two or more of the gases can be used in combination for the gas-filled in the gap.

Further, in the gas-filled light transmitting member, since a thermal insulation gas is filled in the gap under a constant pressure, the outside air pressure that is applied to the vacuum light transmitting member is not applied to the pair of glass plates or transparent resin plates, and therefore, there is no such situation that the light transmitting member is collapsed. Then, there are no fears that the outside air pressure is applied to the glass plate on a rear surface side of the light transmitting member, and therefore, a transparent resin film can be used on the rear surface side in place of the glass plate or transparent resin plate. By adopting this configuration, the weight of the gas-filled light transmitting member can be reduced. Namely, the glass plate or transparent resin plate on a front surface side is formed of a plate material having an appropriate thickness as done in the conventional light transmitting member because a natural external force is possibly applied thereto. Then, a transparent resin film is applied to the rear surface side so as to face the glass plate or transparent resin plate with a gap defined therebetween, and the circumference of the light transmitting member is sealed up. Then, a gas is filled in the gap, whereby the gas-filled light transmitting member is finally formed. Consequently, a spacer becomes unnecessary which holds the gap between the glass plate or transparent resin plate and the transparent resin film.

In addition, in the case of the gas-filled light transmitting member, the temperature of the solar heat collector changes largely from the dry heating temperature (for example, 200 to 250° C.) to the ambient temperature. Because of this, when the gas-filled light transmitting member is formed by using two glass plates (or transparent resin plates), there may be a situation in which the gas-filled in the gap expands in volume 1.5 or more times larger than its volume at normal temperatures, which requires a device to release the internal pressure. In this respect, when the gas-filled light transmitting member is formed by using a glass plate (or transparent resin plate) and a transparent resin film, the transparent resin film preferably inflates to absorb the pressure increased in the gap. In particular, it becomes easy to absorb the change in internal pressure by, for example, forming the transparent resin film into a corrugated configuration, which is more effective.

In addition, sunlight which is reflected on a front surface and a rear surface of the light transmitting member does not contribute to collection of heat, and therefore, it is desirable to form a reflection preventing film on both the front surface and the rear surface of the light transmitting member. As to the material and forming method of such a reflection preventing film, conventionally known materials and forming methods can be referred to.

Additionally, according to the solar heat collector, the space surrounding the absorber plate in the case is formed to be filled with the atmospheric pressure, and therefore, the case and the light transmitting member do not have to be reinforced by a reinforcement member or the like. Because of this, since sunlight incident on the absorber plate is not interrupted by a reinforcement member, there is no reduction in absorbing area of the absorber plate.

BRIEF DESCRIPTION OF THE DRAWINGS

In FIG. 7, (a) is a plan view of a vacuum thermal insulation material of an embodiment which is preferable for the solar heat collector of the present invention, and in FIG. 7, (b) is a sectional view showing a sectional configuration taken along the line (B)-(B) in (a) of FIG. 7.

DETAILED DESCRIPTION OF THE EXEMPLARY EMBODIMENTS

Hereinafter, a solar heat collector of the present invention will be described based on embodiments.

Embodiment 1

Figure 1:
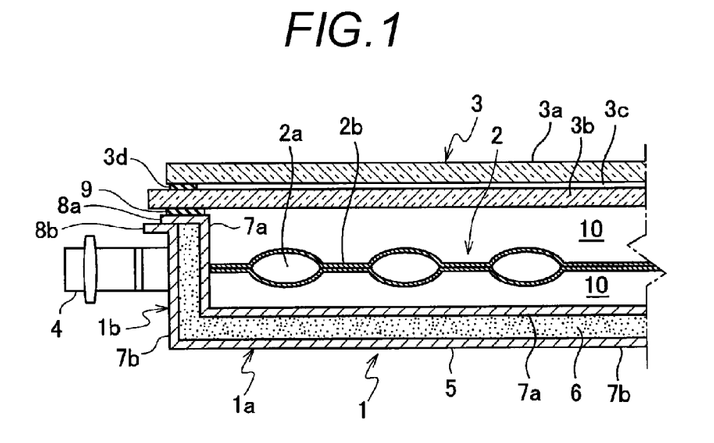
FIG. 1 is a sectional view showing a conceptual configuration of Embodiment 1 of a solar heat collector of the present invention.

A conceptual configuration of a solar heat collector of Embodiment 1 of the present invention is shown in cross section in FIG. 1. As shown in the figure, a solar heat collector member includes a case 1 having, for example, a box shape which has a bottom plate 1a and a side plate 1b and which is opened in an upper surface, an absorber plate 2 which is disposed in an interior of the case 1, and a vacuum light transmitting member 3 which is a light transmitting member provided to cover the opening in the upper surface. The absorber plate 2 is formed by laminating two plate materials which are superior in efficiency with which received sunlight is converted into heat, and in the absorber plate 2, linear flow paths (heat-medium flow paths) 2a through which a heat medium flows and non-flow paths 2b are formed alternately. Ends of each flow path 2a are connected to a heat medium inlet header pipe and a heat medium outlet header pipe, which are not shown. Either of the header pipes is connected to a heat medium inlet pipe (or a heat medium outlet pipe) 4. A space 10 surrounding the absorber plate 2 in the case 1 communicates with the ambient atmospheric pressure.

Next, a characteristic part of Embodiment 1 will be described. Firstly, a first characteristic of Embodiment 1 resides in a thermal insulation construction of the case 1. Embodiment 1 is characterized in that the bottom plate 1a and the side plate 1b are formed of a vacuum thermal insulation material 5. The vacuum thermal insulation material 5, of which the bottom plate 1a and the side plate 1b of Embodiment 1 are formed, is formed in such a way that a core material 6 formed by compressing a thermal insulation material and having thermal insulation properties and a void is enveloped by a skin 7 (an inner skin 7a and an outer skin 7b) which is made up of two metallic materials and a vacuum is created in an interior enveloped by the skin 7, that is, around the core material 6. An upper end portion of the inner skin 7a of the vacuum thermal insulation material 5 of the side plate 1b is bent to form a collar portion 8a which faces a lower surface of the vacuum light transmitting member 3. Then, an upper end portion of the outer skin 7b is bent to form a collar portion 8b so as to match the collar portion 8a. The collar portions 8a and 8b are secured together in an airtight fashion, whereby the rigidity of the side plate 1b is ensured. In addition, a packing 9 is held between the collar portion 8a and the lower surface of the vacuum light transmitting member 3.

The core material 6 of the vacuum thermal insulation material 5 is preferably formed by compressing the thermal insulation material and has the thermal insulation properties and the void. As the core material 6, a fibrous or foamed thermal insulation material selected at least from glass wool, silica-alumina wool, polyester, and urethane is preferably used. Namely, a fibrous or foamed thermal insulation material is preferable which has a low thermal conductivity, as well as an appropriate repulsive force to enhance a void volume which is effective to vacuum thermal insulation. In particular, in Embodiment 1, the core material 6 is preferably formed by compressing a thermal insulation material to a thickness which is 1/10 to 1/20 of a thickness at normal pressures. For example, in Embodiment 1, the core material 6 is formed by compressing white glass wool whose fiber size is 7.5 μm from a thickness of the order of 200 mm to a thickness of 10 mm.

On the other hand, a thin (for example, 0.15 mm to 0.4 mm) stainless steel (SUS) material can be used for the metallic material of the skin 7 which constitutes the vacuum thermal insulation material 5. By doing so, the bottom plate 1a and the side plate 1b which are formed into a flat plate have the construction in which the core material 6 is sandwiched by the skin 7 which is made up of the two thin SUS materials, and therefore, the rigidity of the vacuum thermal insulation material 5 can be enhanced, and even though the two SUS materials are secured together, the vacuum thermal insulation material 5 can be formed thin. In addition to the SUS material, a metallic material such as an aluminum panel or a copper panel having certain strength can be used, and as this occurs, the vacuum thermal insulation material 5 can be used as the bottom plate or the side plate of the case as it is. Additionally, although the strength of the skin 7 increases as the thickness of the metallic material used for the skin 7 increases, the weight of a resulting solar heat collector increases accordingly. Therefore, it is preferable that the thickness of the metallic material used is as thin as possible. In particular, it is preferable to use vacuum thermal insulation materials of other embodiments of the present invention which will be described by the use of FIGS. 7(a) to 8.

The vacuum light transmitting member 3 of Embodiment 1 is configured so that a pair of glass plates 3a, 3b are laminated together via a spacer, not shown, which defines between the glass plates a gap 3c where a vacuum is created and maintained. Additionally, an outer circumferential portion of the gap 3c is vacuum sealed by a vacuum gasket 3d which is held between the pair of glass plates 3a, 3b. Although the glass plates 3a, 3b can be formed by using a normal glass, it is preferable to use a highly transmissive glass whose transmittance is 90% or larger. For example, the transmittance of the highly transmissive glass is about 91.5%, while the transmittance of a normal glass is 86%.

Figure 2:
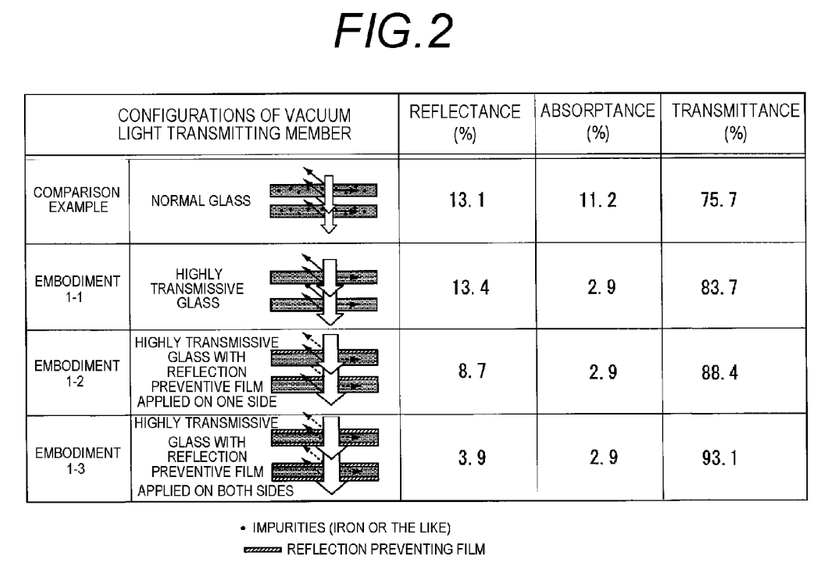
FIG. 2 is a table showing in comparison transmittances of a conventional normal glass, a highly transmissive glass of Embodiment 1, the highly transmissive glass with a reflection preventing film applied on one side and the highly transmissive glass with a reflection preventing film applied on two sides.

Here, according to Embodiment 1, the two glass plates are used to realize a double grazing construction, and as shown in Embodiment 1-1 in FIG. 2, a total transmittance of the two glass plates becomes 0.915×0.915=0.837, which is lower than the transmittance of 86% of the single sheet of normal glass. However, when considering the radiation loss from the light transmitting member, it is preferable to use the vacuum light transmitting member. It is noted that when forming a vacuum light transmitting member by using the normal glass, as shown in a comparison example in FIG. 2, the transmittance of the vacuum light transmitting member becomes 0.757. Further, as will be described later, the transmittance of the vacuum light transmitting member can be enhanced by applying a reflection preventing film on both sides of the highly transmissive glass.

In addition, although the thickness of the glass plates $3a$, $3b$ differs according to the size of a solar heat collector to be fabricated, a glass plate which is 3 mm thick, for example, can be used as the glass plates $3a$, $3b$. Additionally, although there is imposed no specific limitation on the spacer provided between the pair of glass plates $3a$, $3b$, a spacer can be provided by, for example, forming projections of a constant height at constant intervals on one side of the glass plate $3b$ through embossing. For example, projections having a shape of a frustum of circular cone or pyramid are arranged at intervals of 25 mm into a lattice or zigzag fashion, the projections being as high as 0.1 to 0.5 mm and having a base portion which is about 0.5 mm in diameter or one side of which is about 0.5 mm.

In Embodiment 1 described above, while the vacuum light transmitting member 3 is formed by using the glass plates, the present invention is not limited thereto. The vacuum light transmitting member 3 can be formed by using a transparent resin material (acryl, polycarbonate, FEP, PTFE, PTCFE, EVOH). In short, the vacuum light transmitting member 3 can be formed by using any of materials which are superior in sunlight transmission properties, thermal resistance, thermal insulation properties and gas barrier properties.

In addition, although not shown in the figure, it is preferable that a reflection preventing film is formed on both sides of each of the pair of glass plates $3a$, $3b$ which constitutes the vacuum light transmitting member 3 of Embodiment 1 or on an outer surface of the glass plate $3a$ and an inner surface of the glass plate $3b$. A reflection preventing film used for a light transmitting member of a solar heat collector preferably has a light transmittance of 80% or larger for light in a wavelength range of 300 nm to 1,800 nm and preferably in a wavelength range of 300 nm to 2,500 nm. For example, in the case of a reflection preventing film used for a known liquid crystal display panel, a wavelength range of target light to be reflected ranges of from about 400 nm to about 700 nm. In addition, in the case of a photovoltaic panel, an object of the application of such a reflection preventing film is to prevent the reflection of light in the ultraviolet area, and therefore, a reflection preventing film applied is mainly intended to prevent the reflection of light in a short wavelength range. In contrast with this, in the case of the solar heat collector, since the prevention of reflection of light in the infrared area also contributes to enhancement of the collector efficiency, a reflection preventing film is desirable which prevents the reflection of light in the long wavelength range as described above.

In this way, by providing the reflection preventing film having the characteristic of preventing the reflection of light in the wide wavelength range, the amount of sunlight reflected on the outer and inner surfaces of the glass plates $3a$, $3b$ can be reduced, thereby making it possible to enhance the collector efficiency. For example, assuming that the reflection preventing film applied on one side of the glass plate can enhance the transmittance by about 2.5%, as shown in Embodiment 1-2 in FIG. 2, when the reflection preventing film is applied to the outer surface of the glass plate $3a$ and the inner surface of the glass plate $3b$, a transmittance of 91.5% of the single highly transmissive glass is increased substantially to 94%. Therefore, when even two highly transmissive glasses are laminated one on top of the other, a total transmittance becomes 0.94×0.94≈0.884=88.4(%).

On the other hand, as shown in Embodiment 1-3 in FIG. 2, when the reflection preventing film is applied to both the outer and inner surfaces of each of the glass plates $3a$, $3b$, the transmittance of 91.5% of the single highly transmissive glass becomes 96.5%. Then, a total transmittance of the two highly transmissive glasses which are laminated one on top of the other becomes 0.965×0.965≈0.931=93.1(%). As to the material and forming method of such a reflection preventing film, conventionally known materials and forming methods can be referred to. In FIG. 2, absorptance is a ratio of light that is absorbed by an impurity contained in glass such as iron.

Thus, as has been described heretofore, according to Embodiment 1, since at least the bottom plate $1a$ of the case 1 is formed of the vacuum thermal insulation material 5, the radiation of heat from the bottom plate $1a$ can be reduced largely. As a result, the radiation of heat when heat is collected at high temperatures can be reduced so as to enhance the collector efficiency. In addition, the collector efficiency can also be enhanced in collecting heat at low temperatures when insolation is low. For example, the thermal insulation effect of the case 1 of Embodiment 1 becomes 10 or more times better than that of the conventional one. Moreover, since the core material 6 which constitutes the vacuum thermal insulation material 5 is covered by the metal skin 7, even though water intrudes into the interior of the case 1, the water is not absorbed by the core material 6. Therefore, there occurs no such situation that the thermal insulation performance is damaged. Additionally, since it is possible to prevent the occurrence of a phenomenon in which water absorbed into the core material 6 is evaporated to condense into water on the inner surface of the vacuum light transmitting member 3, it is possible to prevent the vacuum light transmitting member 3 from being clouded with water drops to thereby damage the heat absorbing performance thereof.

In addition, according to Embodiment 1, as shown in Embodiments 1-1, 1-2, 1-3 in FIG. 2, the highly transmissive glass whose transmittance is 90% or larger is used for the glass which constitutes the vacuum light transmitting member 3, and further, the reflection preventing film is applied to both the sides of each of the two highly transmissive glasses or to the outer surface of the outer highly transmissive glass and to the inner surface of the inner highly transmissive glass. By doing so, the reduction in transmittance of the vacuum light transmitting member 3 resulting from the adoption of the double grazing construction can be compensated. As a result, the collector efficiency can be enhanced over the wide range from heat collection at low temperatures to heat collection at high temperatures.

Figure 3:
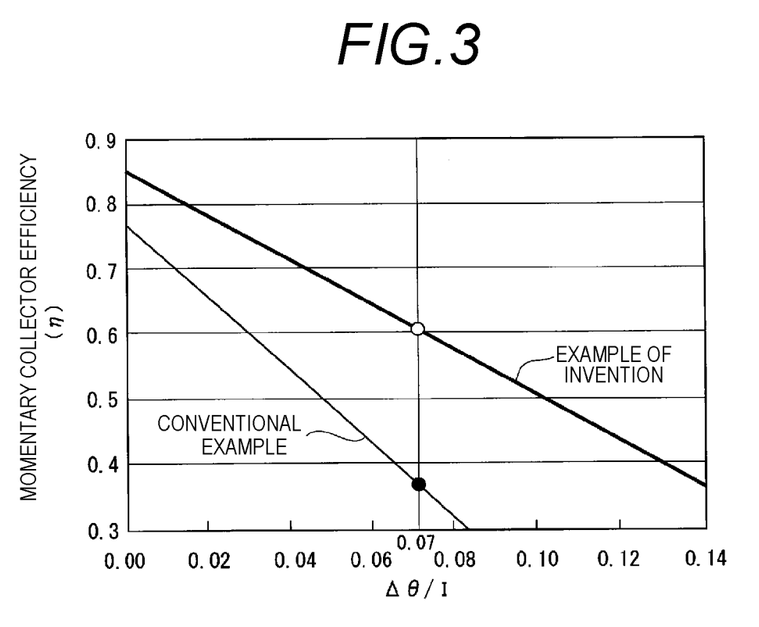
FIG. 3 is a graph showing the results of a simulation in which collector efficiencies are obtained theoretically for Embodiments 1-3 and the conventional example.

The results of a comparison in heat absorbing performance between the solar heat collector according to Embodiment 1-3 and a solar heat collector according to the conventional example is shown in FIG. 3. In FIG. 3, an axis of abscissa represents Δθ/l, and an axis of ordinate represents a momentary collector efficiency η. As shown in the following expression (1), the collector efficiency η is expressed by percentage of a quotient obtained by dividing an absorbing amount Q obtained from the temperature and flow rate of a heat medium which is discharged from the heat medium outlet pipe 4 by an insolation amount. Additionally, the absorbing amount Q correlates with a difference Δθ=(to−ta) between absorbing temperature to and outside air temperature ta. In the expression (1), k denotes a proportional constant.

$$\eta = (Q/I) \times 100 \ [\%] \quad (1)$$
$$= (k \cdot \Delta\theta/I) \times 100 \ [\%]$$

Here, when Δθ which is the difference between absorbing temperature to and outside air temperature ta increases, that is, when the absorbing temperature is set high or when the outside air temperature is low, the radiation loss increases, whereby the collector efficiency η decreases. As is clear from the figure, according to Embodiment 1-3, the radiation loss is reduced and the transmittance is increased, as a result of which even though Δθ increases, the momentary collector efficiency η decreases little. In addition, in a solar heat collector for use for supplying hot water, since Δθ/l=about 0.03 to about 0.05, a superior collector should have a high collector efficiency η in that range on the axis of abscissa in FIG. 3.

As is clear from FIG. 3, since the collector efficiency η decreases as Δθ/l increases, basically, it is necessary that the collector efficiency η where the segment intersects an ordinate axis when Δθ=0 or the amount of heat loss resulting from radiation of heat or the like is reduced. Incidentally, the collector efficiency η when Δθ=0 is a product of the transmittance of the light transmitting member and the absorptance (including the area efficiency) of the absorber plate. Therefore, the transmittance of the light transmitting member becomes very important. On the other hand, when the heat loss resulting from radiation of heat is reduced, the inclination of a straight line representing the collector efficiency η in FIG. 3 becomes less steep, whereby even though the value of Δθ gets larger, the collector efficiency is maintained high. As in Embodiment 1, when the bottom plate 1a and the side plate 1b of the case 1 are formed of the vacuum thermal insulation material 5, although the inclination of the straight line representing the collector efficiency η becomes less steep, the collector efficiency η when Δθ=0 is as low as about 0.6, and therefore, the effective efficiency becomes low. However, since Δθ/l in the normal service range is in the range of about 0.03 to about 0.05, according to Embodiment 1-3, the collector efficiency η can be enhance.

Embodiment 2

Figure 4:
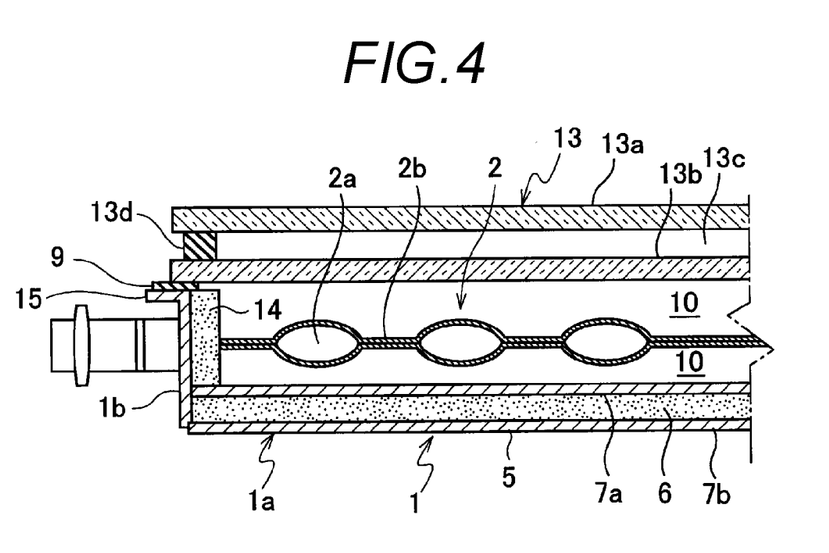
FIG. 4 is a sectional view showing a conceptual configuration of Embodiment 2 of a solar heat collector of the present invention.

FIG. 4 shows a sectional view of a conceptual configuration of a solar heat collector of Embodiment 2 of the present invention. Embodiment 2 differs from Embodiment 1 in that a gas-filled light transmitting member 13, which is a light transmitting member, is used in place of the vacuum light transmitting member 3 and in that a side plate of a case 1 is formed of a normal metallic plate material and a thermal insulation material 14 is affixed to an inner surface of the side plate 1b in place of the vacuum thermal insulation material 5 which constitutes the side plate 1b of the case 1. Since the other constituent parts remain the same as those of Embodiment 1, like reference numerals will be given thereto and the description thereof will be omitted here.

As shown in FIG. 4, the gas-filled light transmitting member 13 is formed in such a way that a thermal insulation gas is filled in a gap 13c defined between a pair of glass plates 13a, 13b via a packing 13d sandwiched therebetween. Here, air or a gas having a low thermal conductivity such as an argon, krypton or xenon gas can be used alone or two or more of the gases can be used in combination for the gas-filled in the gap. In addition, transparent resin plates can be used in place of the glass plates 13a, 13b. Specifically, for the glass plates 13a, 13b, as in the case with Embodiment 1 described above, a normal glass or a highly transmissive glass (whose transmittance is 90% or larger) which is more light transmissive than the normal glass can be used. As the glass plates 13a, 13b, for example, highly transmissive glasses which are 3 mm thick are used, and a packing 13d which is 8 mm thick is used, whereby an argon gas is filled in an interior space defined between the glasses 13a, 13b via the packing 13d to thereby form the gas-filled light transmitting member 13.

A vacuum thermal insulation material 5 of a bottom plate 1a is formed in a similar manner to that of Embodiment 1. However, in Embodiment 2, white glass wool whose fiber size is 3.5 μm is compressed from a thickness of the order of 200 mm to a thickness of 10 mm to form a core material 6. Additionally, the side plate 1b is formed of, for example, a plate material of SUS, and the thermal insulation material 14 is affixed to an inner surface side thereof. A collar portion 15 is formed at an upper end of the side plate 1b, a packing 9 is provided between the collar portion 15 and a glass plate 13b at a lower surface side of the gas-filled light transmitting member 13.

According to Embodiment 2 which is configured in this way, since the bottom plate 1a of the case 1 is formed of the vacuum thermal insulation material 5, the radiation of heat from the bottom plate 1a can be reduced largely. As a result, the radiation of heat when heat is collected at high temperatures can be reduced so as to enhance the collector efficiency. Additionally, the collector efficiency can also be enhanced in collecting heat at low temperatures when insolation is low. Moreover, since the core material 6 which constitutes the vacuum thermal insulation material 5 is covered by a metallic skin 7, even though water intrudes into the interior of the case 1, the water is not absorbed in the core material 6. Therefore, there occurs no such situation in which the thermal insulation performance is damaged. In addition, since it is possible to prevent the occurrence of a phenomenon in which water absorbed into the core material 6 is evaporated to condense into water on the inner surface of the vacuum light transmitting member 3, it is possible to prevent the vacuum light transmitting member 3 from being clouded with water drops to thereby damage the heat absorbing performance thereof.

It is noted that since the surface area of the side plate 1b is smaller than that of the bottom plate 1a of the case 1, the radiation of heat from the side plate 1b is smaller than that from the bottom plate 1a. Therefore, in Embodiment 2 the side plate 1b is not formed of the vacuum thermal insulation material. However, as in the case with Embodiment 1, it is desirable that the side plate 1b is formed of the vacuum thermal insulation material 5. In addition, in the case of Embodiment 2, too, as in the case with Embodiment 1, it is desirable that the reflection preventing film is applied to both sides of each of the glass plates 13a, 13b of the gas-filled light transmitting member 13.

Here, Table 1 shows thermal balances of Embodiment 1, Embodiment 2 and a conventional example. The conventional example corresponds to a solar heat collector having the configuration described in JP-A-62-29484. As is clear from Table 1, according to Embodiment 1 and Embodiment 2, compared with the conventional example, the collector efficiency is enhanced 10% or more.

TABLE 1

|  | Embodiment 1-1 | Embodiment 2 | Conventional Example |
|---|---|---|---|
| Solar energy arriving at light emitting member | 100% | 100% | 100% |
| Solar energy arriving at light transmitting member (glass plate's transmittance of 91% × 2) | 84% | 84% | 87% |
| Solar energy absorbed in light transmitting member (absorptance of 91%) | 76% | 76% | 79% |
| Radiation from light transmitting member | 19% | 16% | 26% |
| Radiation from bottom plate | 7% | 4% | 12% |
| Radiation from side plate | 4% | 4% | 4% |
| Absorbed heat mount (Outlet pipe) | 46% | 52% | 37% |

Embodiment 3

Since the thermal insulation gas is filled under a constant pressure in the gas-filled light transmitting member 13 described in Embodiment 2, the outside air pressure (for example, 10 t/m$^2$) due to the internal vacuum which is applied to the vacuum light transmitting member 3 of Embodiment 1 above is not applied to the pair of glasses 13a, 13b (or the transparent resin plates), and therefore, there occurs no such situation that the gas-filled light transmitting member 13 is collapsed. Then, although not shown, a gas-filled light transmitting member of Embodiment 3 is characterized in that a transparent resin film is used in place of the glass plate 13b (or the transparent resin plate) on the rear surface side of the gas-filled light transmitting member 13. Namely, similarly to the previous embodiment, a glass plate 13a is formed of a plate material of an appropriate thickness (for example 3 mm) because a natural external force is possibly applied thereto. Then, a transparent resin film is laid so as to face the glass plate 13a (or the transparent resin plate) via a gap (for example, 8 mm) defined therebetween, and the circumference of the gap is filled up in a gastight fashion, whereby a gas is filled in the gap to form the gas-filled light transmitting member 13.

In the case of the gas-filled light transmitting member 13 of Embodiment 2, the temperature of the solar heat collector changes largely from the dry heating temperature (for example, 200 to 250° C.) to the ambient temperature. Because of this, when the gas-filled light transmitting member is formed by using two glass plates (or transparent resin plates), there may be a situation in which the gas-filled in the gap expands in volume 1.5 or more times larger than its volume at normal temperatures, which requires a device to release the internal pressure. In this respect, according to the gas-filled light transmitting member of Embodiment 3, since the front surface side is formed of the glass plate (or transparent resin plate) and the rear surface side is formed of the transparent resin film, the transparent resin film can preferably inflate to absorb the pressure increased in the gap.

Figure 5:
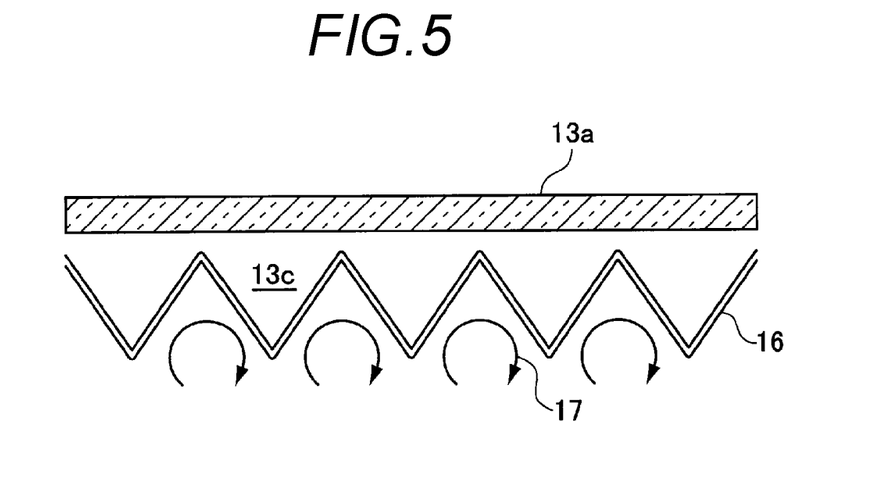
FIG. 5 is a sectional view showing a main part of an example of Embodiment 3 which is a modified example made to Embodiment 2 of the solar heat collector of the present invention.

In addition, in the case of the gas-filled light transmitting member of Embodiment 3, it becomes easy to absorb the change in internal pressure by, for example, using a transparent resin or transparent resin film to form the rear surface side into, for example, a corrugated configuration, which is more effective. In particular, as shown in FIG. 5, it is preferable that a rear surface side transparent resin plate (or transparent resin film) 16 is formed into a V-shaped wave form. According to this configuration, as indicated by arrows 17 in the same figure, the convention of the gas heated by an absorber plate which is produced in spaces on a lower surface side of the transparent resin plate 16 can be suppressed to thereby reduce the radiation of heat from the gas filled light transmitting member, whereby the thermal insulation performance can be enhanced. Namely, according to the vacuum light transmitting member 3 or the gas-filled light transmitting members 13 of Embodiments 1 to 3, the radiation of heat due to convention and conduction of heat within the case 1 can be interrupted by the vacuum layer or the gas-filled layer, and by forming the rear surface side transparent resin plate (or transparent resin film) 16 into the configuration shown in FIG. 5, the radiation of heat due to convention can be reduced.

Embodiment 4

Figure 6:
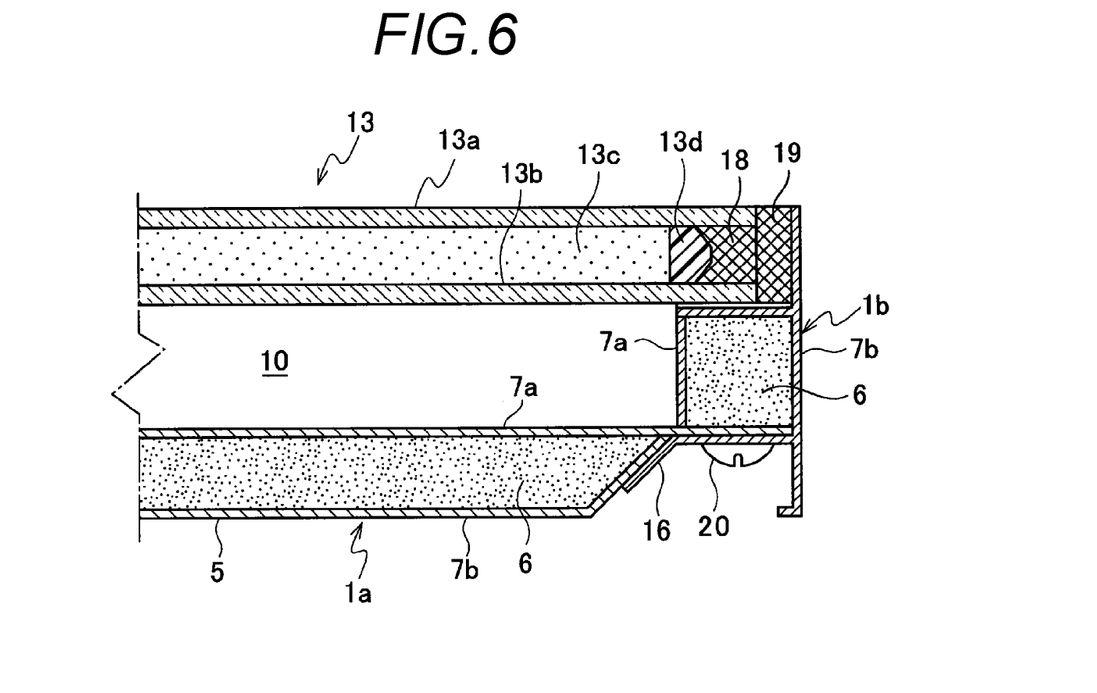
FIG. 6 is a sectional view showing a main part of Embodiment 4 of a solar heat collector of the present invention.

FIG. 6 shows a sectional view showing a main part of Embodiment 4 in which a bottom plate 1a and a side plate 1b of a case 1 are formed of a vacuum thermal insulation material 5. As shown in the figure, Embodiment 4 differs from Embodiment 2 in that the construction of a circumferential edge portion of a gas-filled light transmitting member 13 and the construction of the vacuum thermal insulation material 5 of the bottom plate 1a and the side plate 1b differ from those of Embodiment 2. The other constituent parts remain the same as those of Embodiment 2, like reference numerals will be given thereto and the description thereof will be omitted here. As shown in the figure, a packing 13d is sandwiched by a pair of glass plates 13a, 13b of the gas-filled light transmitting member 13 at circumferential edge portions thereof. In addition, the circumferential edge portions of the pair of glass plates 13a, 13b by sealing members 18, 19.

On the other hand, the vacuum thermal insulation material 5 which constitutes the bottom plate 1a has an edge portion where circumferential edge portions of skins 7a, 7b are secured to each other and is formed into a protuberant configuration at a portion where a cross material 6 is loaded. On the other hand, the vacuum thermal insulation material 5 which constitutes the side plate 1b is formed in such a way that a vertical plate having a leg portion which is bent into an L-shape is used as a skin 7b and a core material 6 is loaded in a space surrounded by the skin 7b and a skin 7a. The skin 7b of the side plate 1b extends to the position of an outer surface of the sealing member 19 so as to function as a fastening member of the sealing member 19. An edge portion of the vacuum thermal insulation material 5 which constitutes the bottom plate 1a is provided as to double as part of the skin of the vacuum thermal insulation material 5 of the side plate 1b. The edge portion of the vacuum thermal insulation material 5 which constitutes the bottom plate 1a is fixed to the vacuum thermal insulation material 5 of the side plate 1b with a machine screw 20. It is noted that the joint portion between the skins 7 of the vacuum thermal insulation material 5 are secured together in a gastight fashion by, for example, brazing or the like.

Embodiment 5

Figure 7:
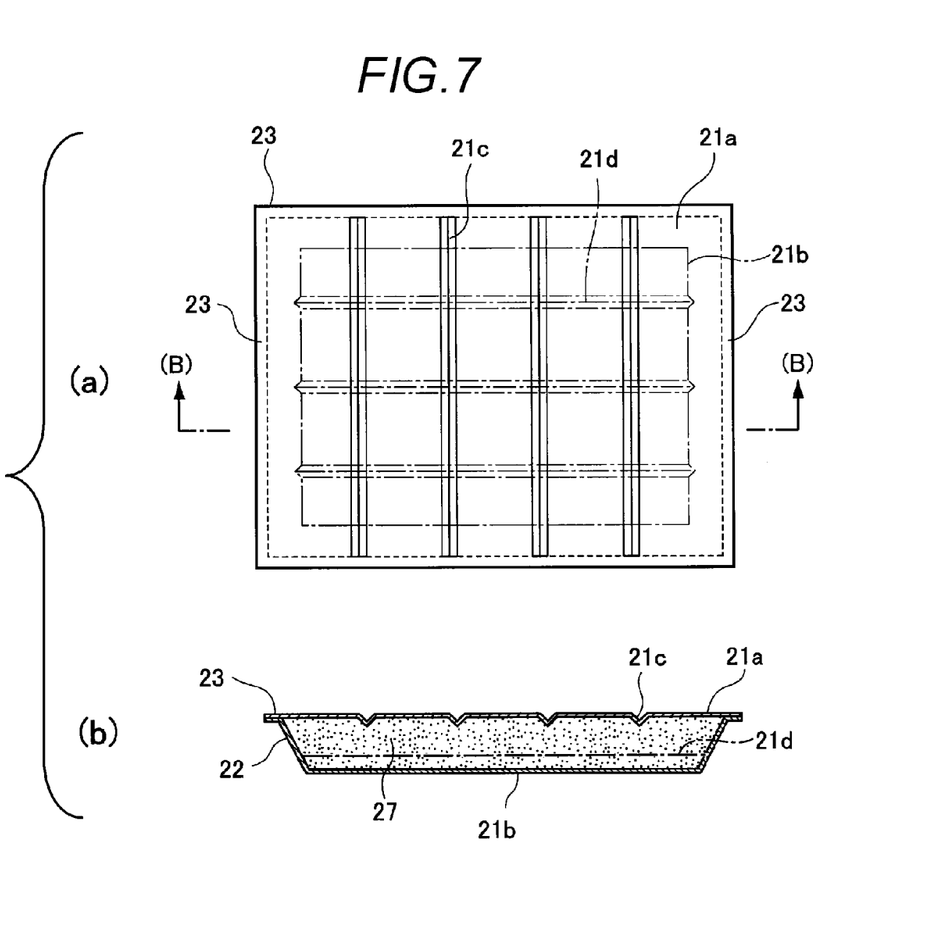

FIG. 7 shows a plan view and a sectional view of a vacuum thermal insulation material 5 for use for a solar heat collector of this embodiment. FIG. 7(b) is the sectional view taken along the line (B)-(B) in FIG. 7(a). As shown in those figures, a skin 21 making up the vacuum thermal insulation material 5 includes an inner skin 21a and an outer skin 21b. The inner skin 21a is formed by using a rectangular metal panel, and although a circumferential edge portion 23 is formed flat, a plurality of line grooves 21c of a triangular section are formed at predetermined intervals in a portion other than the circumferential edge portion. Additionally, the outer skin 21b is formed by using a rectangular metal panel which is drawn into an inverted frustum of pyramid, and end portions of sloping surfaces 22 of the inverted frustum of pyramid are formed so as to be welded to the circumferential end portion 23 of the inner skin 21a. This welding needs to withstand the dry heating temperature (for example, 200 to 250° C.). In addition, a plurality of line grooves 21d are formed at predetermined intervals in a bottom surface of the inverted frustum of pyramid. In this embodiment, the inner skin 21a and the outer skin 21b are disposed so that sides thereof from which bottoms of the line grooves 21c, 21d protrude are oriented inwards and that the line grooves 21c, 21d intersect each other at right angles. A core material 27 which is formed by compressing a thermal insulation material and which has a void is loaded in a space sandwiched by the outer skin 21a and the inner skin 21b and a vacuum is created in the space.

According to the vacuum thermal insulation material 5 of this embodiment which is configured in the way described above, the line grooves 21c, 21d having the triangular section are formed in the inner skin 21a and the outer skin 21b which are made up of the two metal panels disposed to face each other with the core material 27 sandwiched therebetween. Therefore, the rigidity of the inner skin 21a and the outer skin 21b can be enhanced. By doing so, even though the inner skin 21a and the outer skin 21b are formed by using a thin metal panel, the vacuum thermal insulation material 5 can withstand sufficiently the negative pressure produced by vacuum. For example, a stainless steel (SUS) material having a thickness in the range of 0.15 mm to 0.4 mm can be used.

It is preferable that a height of the protruding bottoms of the line grooves 21c, 21d (or a depth of the grooves) is in the range of 0.1 mm to 2 mm and that the pitches or intervals at which the line grooves are formed is in the range of 3 mm to 50 mm. In addition, it is preferable that a thickness of the core material 27 sandwiched by the inner skin 21a and the outer skin 21b is in the range of 3 mm to 25 mm. In addition to the SUS material, a metallic material such as an aluminum panel or a copper panel having certain strength can be used, and as this occurs, the vacuum thermal insulation material 5 can be used as the bottom plate and the side plate of the case as it is.

In addition, the inner skin 21a and the outer skin 21b are disposed so that the sides thereof from which the bottoms of the line grooves 21c, 21d protrude face each other and the core material 27 which is formed by compressing the thermal insulation material is sandwiched by the inner and outer skins. Therefore, although the inner skin 21a and the outer skin 21b are not disposed so that the sides thereof from which the bottoms of the line grooves 21c, 21d protrude are in contact with each other, the vacuum thermal insulation material 5 can withstand sufficiently the negative pressure produced by vacuum. As a result, even though the gap between the inner skin 21a and the outer skin 21b is narrowed, the thermal insulation performance can be ensured, whereby the vacuum thermal insulation material 5 can be formed thin, which enables the solar heat collector to be light in weight and small in size.

Further, in the vacuum thermal insulation material 5 of this embodiment, the arrangement of the inner skin 21a and the outer skin 21b is not limited to the one in which the inner skin 21a and the outer skin 21b are disposed so that the line grooves 21c, 21d thereof intersect at right angles. For example, the respective line grooves 21c, 21d of the inner and outer skins may be disposed in the same positions or may be disposed parallel in different positions. Further, the line grooves 21c, 21d may be disposed to intersect each other at a certain angle (for example, 45°).

Figure 8:
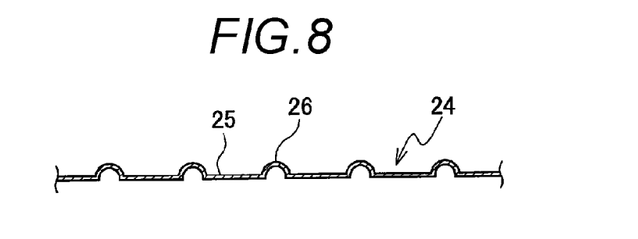
FIG. 8 shows a sectional configuration of a metal panel of a vacuum thermal insulation material of another embodiment which is preferable for the solar heat collector of the present invention.

In addition, the sectional shape of the line grooves is not limited to the triangular shape, and therefore, as shown in, for example, FIG. 8, line grooves 26 in a skin 24 (an inner skin or an outer skin) may be formed into an arc-like shape in section. Further, although not shown, line grooves having a sine semi-wave section may be adopted. Furthermore, although not shown, it is preferable to provide a laminar radiant heat shielding member such as an aluminum sheet which interrupts the passage of radiant heat in a middle position of the core material 27 which is sandwiched by the skins 24. By doing so, the radiation of radiant heat is interrupted, thereby making it possible to enhance the collector efficiency further.

According to the solar heat collector of the present invention, the radiation of heat from the bottom plate and the side plate of the case of the flat plate-type solar heat collector can be reduced, and the collector efficiency can be enhanced over the wide range from the heat collection at low temperatures to the heat collection at high temperatures.

What is claimed is:

1. A solar heat collector comprising:
a case having a bottom plate and a side plate, and opened in an upper surface;
a light transmitting member provided to cover an opening in the upper surface of the case and formed of a glass plate or a transparent resin plate;
an absorber plate disposed between the bottom plate of the case and the light transmitting member to convert received sunlight into heat;
a heat-medium flow path thermally connected to the absorber plate; and
an inlet pipe and an outlet pipe for a heat medium which communicates with the heat-medium flow path, wherein
at least the bottom plate of the case includes a skin and a core material enveloped and compressed within an interior of the skin, the core material is a thermal insulation material having thermal insulation properties and a void, and a vacuum exists in the interior of the skin,
the skin includes two metal panels which are disposed to face each other with the core material sandwiched therebetween and circumferential edges of the two metal panels are welded together,
a plurality of line grooves having any of a triangular section, an arc-shaped section and a sine semi-wave section are formed in the metal panels, and
the two metal panels are disposed to face each other on sides thereof from which bottoms of the line grooves protrude with the core material sandwiched therebetween.

2. The solar heat collector according to claim 1, wherein the light transmitting member is a vacuum light transmitting member in which a vacuum exists in a gap defined between a pair of glass plates or transparent resin plates with a space sandwiched therebetween.

3. The solar heat collector according to claim 1, wherein the light transmitting member is a gas-filled light transmitting member in which a gap is defined between a pair of glass plates or transparent resin plates and a gas is filled in the gap.

4. The solar heat collector according to claim 2, wherein the glass plates which constitute the light transmitting member is formed of a highly transmissive glass whose transmittance is 90% or larger.

5. The solar heat collector according to claim 4, wherein the glass plates which constitute the light transmitting member has a reflection preventing film, whose transmittance of light of a wavelength in a range from 300 nm to 2,500 nm is 80% or larger, being applied to at least one side of the glass plates.

6. The solar heat collector according to claim 1, wherein the light transmitting member is a gas-filled light transmitting member in which a transparent resin film is provided to face a glass plate or a transparent resin plate with a gap defined therebetween and a gas is filled in the gap.

7. The solar heat collector according to claim 3, wherein the glass plates which constitute the light transmitting member is formed of a highly transmissive glass whose transmittance is 90% or larger.

8. The solar heat collector according to claim 7, wherein the glass plates which constitute the light transmitting member has a reflection preventing film, whose transmittance of light of a wavelength in a range from 300 nm to 2,500 nm is 80% or larger, being applied to at least one side of the glass plates.

9. The solar heat collector according to claim 1 wherein the absorber plate is spaced apart from the bottom plate.

10. The solar heat collector according to claim 1 wherein the heat-medium flow path extends within the absorber plate.

11. The solar heat collector according to claim 6 wherein the transparent resin film is located between the absorber plate and the glass plate or the transparent resin plate.

12. The solar heat collector according to claim 6 wherein the transparent resin film has a V-shaped wave form in cross-section.

* * * * *